(No Model.)
F. J. BROWN & A. & S. ALLEN.
TRANSMITTING GEAR FOR WINDMILLS.
No. 531,504. Patented Dec. 25, 1894.
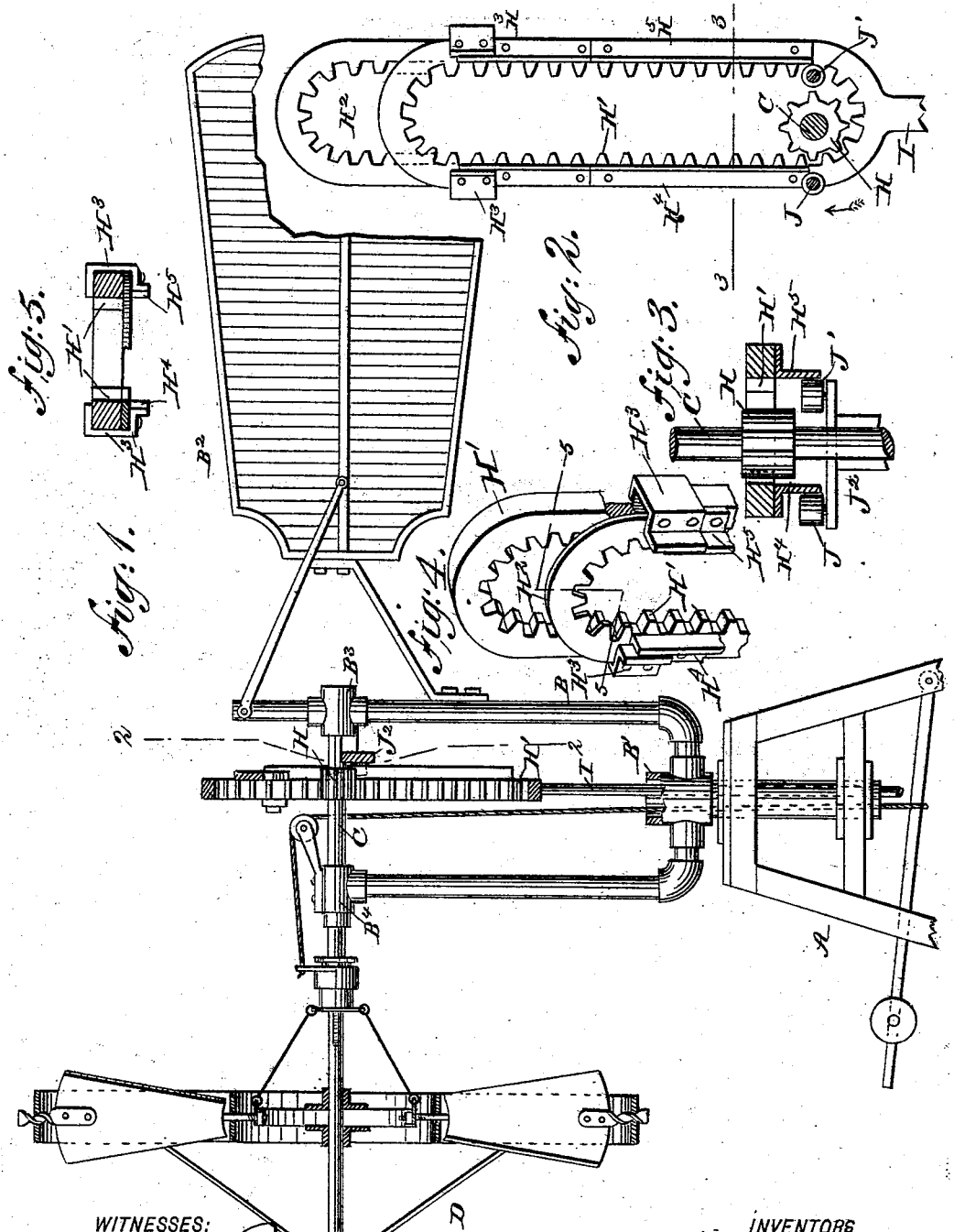

UNITED STATES PATENT OFFICE.

FRANK J. BROWN, ALFRED ALLEN, AND SOLOMON ALLEN, OF HALSTEAD, KANSAS.

TRANSMITTING-GEAR FOR WINDMILLS.

SPECIFICATION forming part of Letters Patent No. 531,504, dated December 25, 1894.

Application filed December 27, 1893. Serial No. 494,834. (No model.)

*To all whom it may concern:*

Be it known that we, FRANK J. BROWN, ALFRED ALLEN, and SOLOMON ALLEN, of Halstead, in the county of Harvey and State of Kansas, have invented a new and Improved Transmitting-Gear for Windmills, of which the following is a full, clear, and exact description.

Our invention relates to improvements in windmills, and has for its object to provide an improved transmitting gear therefor.

The invention consists of certain parts and details and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of a windmill having our improvement applied. Fig. 2 is an enlarged transverse section of the transmitting gear, the section being taken on the line 2—2 of Fig. 1. Fig. 3 is a sectional plan view of the same on the line 3—3 of Fig. 2. Fig. 4 is a detail perspective view of the transmitting gear, and Fig. 5 is a section on line 5—5, Fig. 4.

In the upper end of the tower A is mounted to turn the hollow shaft B' supporting the frame B provided at its rear end with the usual vane $B^2$, to hold the wheel in the wind in the usual manner. On the frame B are arranged the bearings $B^3$ and $B^4$, in which is journaled the wheel shaft C carrying at its forward end the wheel D which may be of any approved type.

On the shaft C, between the bearings $B^3$ and $B^4$, is secured a pinion H in mesh with an elongated internal rack H' connected at its lower end with a rod I extending downwardly through the hollow shaft B' to connect with the machinery to be driven by the windmill. The elongated rack H' shown in detail in Figs. 2, 3, 4, and 5, is provided with a segmental auxiliary rack $H^2$, which serves to regulate the length of the stroke given to the elongated rack H' by the pinion H. The rack $H^2$ is preferably secured to the rack H' by clips $H^3$ formed with or secured to the rack $H^2$, said clips embracing the rack H' and bolted thereto, as shown most clearly in Figs. 4 and 5. It will thus be seen that by adjusting the auxiliary rack $H^2$ on the rack H', the stroke of the rack H' can be increased or diminished, as desired.

In order to cause the rack H' to remain in mesh at all times with the pinion H, we provide the said rack with two vertically disposed guide-ways $H^4$ and $H^5$, on which travel the friction rollers J J' respectively, held on an arm $J^2$ projecting from the bearing $B^3$ of the main frame B, as plainly shown in Fig. 1. The guideways $H^4$ and $H^5$ are made in sections and the sections are detachably secured to the rack H', so that the guideways can be lengthened or shortened according to the adjustment of the auxiliary rack $H^2$ on rack H', by attaching or removing one or more sections of each guideway. Now, it will be seen that when the shaft C rotates in the direction of the arrow $b'$, as indicated in Fig. 2, and the pinion H meshes with the lowermost teeth of the elongated rack H', then the friction rollers J and J' leave the lower ends of the guideways $H^4$ and $H^5$, respectively, to permit the pinion H to draw the rack H' to one side until the pinion H engages the right hand side of the said rack at which time the friction roller J travels on the inside of its guideway $H^4$ and the other friction roller J' travels up the outside of its guideway $H^5$. The rack H', during the time it is in mesh at its right hand side with the pinion H, is moved downward, and when the upper end of the rack H' moves in mesh with the pinion H, then the friction rollers J and J' leave the upper ends of their guideways to permit the pinion H to draw the rack H' to the right to cause the friction roller J to move in contact with the outer face of its guideway $H^4$ and the other friction roller J' to move in contact with the inner face of its guideway $H^5$. The left hand side of the rack H' is then in mesh with the pinion H and an upward movement is given to the said rack. By adjusting the segmental rack and lengthening or shortening the guideways $H^4$ and $H^5$ hereinbefore described, the stroke of the rack H' and consequently that of the rod I can be readily increased or diminished.

Having thus fully described our invention, we claim as new and desire to secure by Letters Patent—

1. The combination with a driven shaft, a pinion thereon, an elongated internal rack, and means for holding the rack in mesh with the pinion, of an auxiliary segmental rack adjustably secured to the elongated rack, substantially as and for the purpose set forth.

2. The combination with a driven shaft, a pinion thereon, and an elongated internal rack meshing with the pinion, of an auxiliary segmental rack adjustably secured to the elongated rack, adjustable guides on the elongated rack, and projections on a fixed support for engaging the guides to hold the rack in mesh with the pinion, substantially as described.

3. In a transmitting gear, an elongated internal rack provided with vertically disposed guides, and with an adjustable auxiliary segmental rack, substantially as and for the purpose set forth.

4. A transmitting gear, comprising, a pinion on the main shaft, an elongated internal rack engaging the pinion, guideways formed in sections detachably secured to the rack, friction rollers on a fixed support and engaging the guideways to hold the rack in engagement with the pinion, and an auxiliary segmental rack adjustably secured to the elongated rack, substantially as herein shown and described.

FRANK J. BROWN.
ALFRED ALLEN.
SOLOMON ALLEN.

Witnesses:
   DAVID A. SMITH,
   D. S. MARCY.